United States Patent
Nakano et al.

(10) Patent No.: US 7,053,817 B2
(45) Date of Patent: May 30, 2006

(54) TARGET DETERMINATION APPARATUS

(75) Inventors: Masao Nakano, Kanagawa (JP); Etsuo Kakishita, Hyogo (JP)

(73) Assignees: Fujitsu Ten Limited, Kobe (JP); Fujitsu Limited, Kawasaki (JP)

( * ) Notice: Subject to any disclaimer, the term of this patent is extended or adjusted under 35 U.S.C. 154(b) by 0 days.

(21) Appl. No.: 10/854,714

(22) Filed: May 27, 2004

(65) Prior Publication Data
US 2005/0099332 A1 May 12, 2005

(30) Foreign Application Priority Data
Jun. 3, 2003 (JP) .............................. 2003-157572

(51) Int. Cl.
*G01S 13/88* (2006.01)
*G01S 13/00* (2006.01)
*G01S 13/93* (2006.01)

(52) U.S. Cl. ........................... 342/90; 342/27; 342/28; 342/70; 342/89; 342/104; 342/109; 342/118; 342/175; 342/195

(58) Field of Classification Search .................. 342/27, 342/28, 70–72, 89, 90, 175, 192–197, 104–146; 701/300, 301; 180/167–169; 367/87–116
See application file for complete search history.

(56) References Cited

U.S. PATENT DOCUMENTS

| 5,574,463 A | * | 11/1996 | Shirai et al. ................... 342/70 |
| 6,249,243 B1 | * | 6/2001 | Takagi ......................... 342/70 |
| 6,377,205 B1 | * | 4/2002 | Eckersten et al. ............. 342/90 |
| 6,518,916 B1 | * | 2/2003 | Ashihara et al. .............. 342/70 |

FOREIGN PATENT DOCUMENTS

JP        A 11-133151        5/1999

OTHER PUBLICATIONS

Patent application for Nakano et al.

\* cited by examiner

*Primary Examiner*—Bernarr E. Gregory
(74) *Attorney, Agent, or Firm*—Oliff & Berridge, PLC

(57) ABSTRACT

A target determination apparatus includes a reception unit, a judgment unit, and a determination unit. The reception unit receives a reflection wave from a target. The judgment unit judges as to whether or not a fluctuation state of reception intensity of the reflection wave with time corresponds to a distinction state occurring when the target is a predetermined type, on the basis of information concerning the reception intensity of the reflection wave. The determination unit determines type of the target on the basis of judgment result of the judgment unit.

14 Claims, 8 Drawing Sheets

TARGET DETERMINATION APPARATUS

BACKGROUND OF THE INVENTION

1. Field of the Invention

This invention relates to a target determination apparatus and more particularly to a target determination apparatus, which determines as to whether or not the target is a human being.

2. Description of the Related Art

A system for measuring the distance between a vehicle and another vehicle ahead and the relative velocity therebetween using a radar (radio detecting and ranging) technology and holding the distance between the vehicle and the other vehicle ahead based on the measurement values is available as a vehicle driving support system.

FIG. 8 is a block diagram to schematically show the main part of a radar according to a related art for measuring the distance and the relative velocity between the vehicle and the other vehicle ahead. In the figure, numeral 1 denotes a radar. The radar 1 includes a microcomputer 2, a transmission antenna 3, a pulse transmission unit 4, a reception antenna 5, and a delay detection unit 6. The pulse transmission unit 4 emits an electromagnetic pulse from the transmission antenna 3. The electromagnetic wave emitted from the transmission antenna 3 and striking a target T (for example, the vehicle ahead) is again radiated (namely, reflected) in every direction at the target T and only a part of the electromagnetic wave is returned in the original direction. The reception antenna 5 receives a very small amount of the returned electromagnetic pulse.

The delay detection unit 6 is connected to the pulse transmission unit 4, to keep track of the electromagnetic pulse emitting timing, and is connected to the reception antenna 5, to keep track of the reflection pulse receiving timing, and can detect the time between emitting the electromagnetic pulse and receiving the reflection pulse (namely, delay time) Letting the delay time be Δt, distance R to the target T can be found as cΔt/2 (where c is the speed of light and is $3 \times 10^8$ m/s).

The microcomputer 2 can be connected to the delay detection unit 6, to acquire data concerning the delay time Δt. The microcomputer 2 includes a distance calculation unit 2a and a relative velocity calculation unit 2b. The distance calculation unit 2a finds the distance R to the target T based on the data concerning the delay time Δt provided by the delay detection unit 6. The relative velocity calculation unit 2b monitors the distance R found by the distance calculation unit 2a in time sequence and finds relative velocity Δv of the target T based on the change of the distance R with time. Thus, the radar technology is applied and the radar 1 is installed in a vehicle, whereby an excellent driving support system can be realized.

As systems using the radar technology, a preventive safety system for previously detecting a pedestrian and preventing an accident from occurring is proposed in addition to the driving support system. One preventive safety system uses a radar to detect a pedestrian out of the visual range of headlights in the night and a pedestrian on a crosswalk and informs the driver of the presence of the pedestrian.

SUMMARY OF THE INVENTION

The radar according to the related art as described above, can obtain the distance R to the target T and the relative velocity Δv of the target T. However, the radar according to the related art cannot determine as to whether or not the target T is a pedestrian (human being) (for example, whether the target T is a human being or another vehicle).

JP-A-Hei.11-133151 discloses an art wherein an ultrasonic pulse is used and if the reflected wave level coming back from the detection area fluctuates exceeding a preset stipulated level, an object within the detection area is detected as a human being. However, in order to make it possible to set the stipulated level, the detection area needs to be specialized to one area (for example, the front door of a house) and the art disclosed in JP-A-Hei.11-133151 cannot be adopted for a vehicle with the detection area changing momentarily.

In the art disclosed in JP-A-Hei.11-133151, whether or not the reflected wave level fluctuates exceeding the stipulated level is only determined and therefore whether or not an invasion object into the detection area exists can be detected, but whether or not the invasion object is a human being (for example, whether the invasion object is a human being or a vehicle) cannot be determined.

By the way, an object that a vehicle collides with is not limited to a pedestrian, of course, and may be another vehicle. It is desirable that steps to be taken at the collision time should be responsive to the object that the vehicle collides with. Thus, for the purpose of lessening harm at the collision time, it is also very important to determine as to whether or not the target T is a human being.

The invention provides a target determination apparatus, which can determine as to whether or not the target is a human being.

It is very important to determine whether an object existing in the surroundings of a vehicle is a human being or another vehicle as described above. Then, the inventors focused attention on the reception intensity of each reflection pulse, which is electromagnetic pulses emitted to and struck a human being and a vehicle as targets and come back therefrom using a radar. The inventor found that the fluctuation state of the reception intensity of each reflection pulse from the human being and the vehicle with time was uncertain but had one feature and involved statistical nature. As a result, the inventors made the invention.

According to an embodiment of the invention, a target determination apparatus (1) includes a reception unit, a first judgment unit, and a determination unit. The reception unit receives a reflection wave from a target. The first judgment unit judges as to whether or not a fluctuation state of reception intensity of the reflection wave with time corresponds to a distinction state occurring when the target is a predetermined type, on the basis of information concerning the reception intensity of the reflection wave. The determination unit determines type of the target on the basis of judgment result of the first judgment unit.

FIG. 1 is a graph to show the fluctuation state of the reception intensities with time in a case where a radar emits electromagnetic pulses to human being and a vehicle as targets, the electromagnetic pulses strike the human being and the vehicle, and the radar receives the electromagnetic pulses come back therefrom. The horizontal axis indicates the time and the vertical axis indicates the reception intensity. The solid line indicates the fluctuation state of the reception intensity of the reflection wave from the human being with time. The dashed line indicates the fluctuation state of the reception intensity of the reflected wave from the vehicle with time.

As seen in the graph of FIG. 1, the reception intensity of the reflection wave from the human being repeats increase and decrease roughly periodically and has certain regularity (fading) such as Rayleigh distribution or Ricean distribution; while, the reception intensity of the reflection wave from the vehicle is roughly constant.

One of the possible reasons is that the intensity of the reflection wave from the target depends on the size, the shape, and the conductivity of the target. Since the reflection wave from the human being is comparatively small, the reception intensity falls every given period t. If relative motion does not exist between the target and the radar (namely, the relative velocity is (0), the period (Doppler period) t becomes infinite. However, if relative motion exists between the target and the radar, Doppler frequency occurs because of Doppler effect and the reception frequency of the radar deviates from the transmission frequency by the Doppler frequency and therefore it is imagined that Rayleigh distribution or Ricean distribution occurs.

The target determination apparatus (1) judges whether or not the fluctuation state of the reception intensity from the target with time corresponds to the distinctive state occurring when the target is the predetermined type (for example, human being or vehicle), and determines the type of the target based on the judgment result.

Thus, for example, if the fluctuation state of the reception intensity of the reflection wave from the target with time is the distinctive state occurring when the target is a human being (for example, a state in which the reception intensity repeats increase and decrease roughly periodically), the target can be determined to be a human being; on the other hand, if the fluctuation state of the reception intensity of the reflected wave from the target with time is the distinctive state occurring when the target is a vehicle (for example, a state in which the reception intensity is roughly constant), the target can be determined to be a vehicle.

Accordingly, it can be determined as to whether or not the target is a human being, so that the performance of a preventive safety system for preventing a vehicle from colliding with a pedestrian can be enhanced. It can also be determined as to whether an object that the vehicle collides with is a pedestrian or another vehicle, so that the steps to be taken at the collision time can be made in response to the object that the vehicle M collides with and the performance of a collision safety system can be enhanced.

In a target determination apparatus (2) according to an embodiment of the invention, when the reception intensity of the reflection wave repeats increase and decrease roughly periodically, the first judgment unit judges that the fluctuation state of the reception intensity of the reflection wave with time corresponds to a distinction state occurring when the target is human being.

As described above, the fluctuation state of the reception intensity of the reflection wave from an object with time is distinctive depending on the type of object and the reception intensity of the reflection wave from the human being repeats increase and decrease roughly periodically (see FIG. 1).

According to the target determination apparatus (2), if the reception intensity of the reflected wave from the target repeats increase and decrease roughly in the predetermined period, it is judged that the fluctuation state of the reception intensity with time corresponds to the distinctive state occurring when the target is a human being. Thus, if the reception intensity of the reflection wave from the target repeats increase and decrease roughly in the predetermined period, the target can be determined to be a human being, so that the determination as to whether or not the target is a human being can be made with good accuracy.

In a target determination apparatus (3) according to an embodiment of the invention, when the reception intensity of the reflection wave is roughly constant, the first judgment unit judges that the fluctuation state of the reception intensity of the reflection wave with time corresponds to a distinction state occurring when the target is a vehicle.

As described above, the fluctuation state of the reception intensity of the reflection wave from an object with time is distinctive depending on the type of object and the reception intensity of the reflection wave from the vehicle is roughly constant (see FIG. 1).

According to the target determination apparatus (3), if the reception intensity of the reflection wave from the target is roughly constant, it is judged that the fluctuation state of the reception intensity with time corresponds to the distinctive state occurring when the target is a vehicle. Thus, if the reception intensity of the reflection wave from the target is roughly constant, the target can be determined to be a vehicle, so that the determination as to whether or not the target is a vehicle can be made with good accuracy.

In a target determination apparatus (4) according to an embodiment of the invention, the first judgment unit judges as to whether or not the fluctuation state of reception intensity of the reflection wave with time corresponds to the distinction state occurring when the target is a predetermined type, on the basis of a reception frequency distribution of the reflection wave, which is obtained from the reception intensity of the reflection wave.

FIG. 2 is a graph to show the fluctuation state of the reception intensities with time in a case where a radar emits electromagnetic pulses to human being and a vehicle as targets, the electromagnetic pulses strike the human being and the vehicle, and the radar receives the electromagnetic pulses come back therefrom. The horizontal axis indicates the reception intensity and the vertical axis indicates the reception frequency. The solid line indicates the reception frequency distribution of the reflection wave from the human being. The dashed line indicates the reception frequency distribution of the reflection wave from the vehicle. The reception frequency mentioned here means the occurrence frequency of a signal whose reception intensity is one magnitude; for example, it shows that the occurrence frequency of the reflection signal with reception intensity $p_1$ among the reflection signals from the human being is $d_1$.

As seen in the graph of FIG. 2, there is a large difference between the reception frequency distribution of the reflection waves from the human being and that from the vehicle. For example, the width of the reception intensities of the reflection waves from the human being is comparatively wide; while, the width of the reception intensities of the reflection waves from the vehicle is comparatively narrow.

According to the target determination apparatus (4), it is determined whether or not the fluctuation state of the reception intensity of the reflection wave with time corresponds to the distinctive state occurring when the target is the predetermined type, on the basis of the state of the reception frequency distribution of the reflection wave, which is obtained from the reception intensity of the reflection wave.

As described above, the reception frequency distribution of the reflection wave from the target based on the magnitude of the reception intensity is also distinctive depending on the type of target. Thus, for example, if the reception frequency distribution of the reflection wave from the target is a distinctive distribution occurring when the target is a human being (for example, if a width of the reception intensities is comparatively wide), the target can be determined to be a human being; on the other hand, if the reception frequency distribution of the reflection wave from the target is a distinctive distribution occurring when the target is a vehicle (for example, if a width of the reception intensities is comparatively narrow), the target can be determined to be a vehicle.

In a target determination apparatus (5) according to an embodiment of the invention, the first judgment unit judges as to whether or not the fluctuation state of reception intensity of the reflection wave with time corresponds to the distinction state occurring when the target is a predetermined type, on the basis of a cumulative reception frequency distribution of the reflection wave, which is obtained from the reception intensity of the reflection wave.

FIG. 3 is a graph to show the fluctuation state of the reception intensities with time in a case where a radar emits electromagnetic pulses to human being and a vehicle as targets, the electromagnetic pulses strike the human being and the vehicle, and the radar receives the electromagnetic pulses come back therefrom. The horizontal axis indicates the reception intensity and the vertical axis indicates the probability of the reception cumulative frequency. The solid line indicates the probability distribution of the reception cumulative frequency of the reflection wave from the human being. The dashed line indicates the probability distribution of the reception cumulative frequency of the reflection wave from the vehicle. The reception cumulative frequency mentioned here means the occurrence frequency of a signal whose reception intensity is equal to or less than one magnitude; for example, it shows that the occurrence probability of the reflection signal with reception intensity $p_2$ or less among the reflection signals from the human being is 50%.

As seen in the graph of FIG. 3, there is a large difference between the reception cumulative frequency distribution of the reflection waves from the human being and that from the vehicle. For example, the reflection waves from the human being also contain those with comparatively low intensity, but the reflection waves from the vehicle do not contain any reflected wave with low intensity.

According to the target determination apparatus (5), it is judged as to whether or not the fluctuation state of the reception intensity of the reflection wave from the target with time corresponds to the distinctive state occurring when the target is the predetermined type, on the basis of the state of the reception cumulative frequency distribution of the reflection wave from the target, which is obtained from the reception intensity of the reflection wave.

As described above, the reception cumulative frequency distribution of the reflection wave from the target based on the magnitude of the reception intensity is also distinctive depending on the type of target. Thus, for example, if the reception cumulative frequency distribution of the reflection wave from the target is a distinctive distribution occurring when the target is a human being (for example, if the reflection waves contain a reflected wave with comparatively low intensity), the target can be determined to be a human being; on the other hand, if the reception cumulative frequency distribution of the reflection wave from the target is a distinctive distribution occurring when the target is a vehicle (for example, if the reflection waves do not contain a reflected wave with low intensity), the target can be determined to be a vehicle.

A target determination apparatus (6) according to an embodiment of the invention, further includes a second judgment unit which judges as to whether or not the target moves. The determination unit determines the type of the target on the basis of the judgment result of the first judgment unit and judgment result of the second judgment unit.

As described above, the fluctuation state of the reception intensity of the reflection wave from a human being or a vehicle with time is distinctive depending on the human being or the vehicle and it can be judged as to whether the target is a human being or a vehicle from the fluctuation state of the reception intensity of the reflection wave from the target with time.

However, the reflection wave from a building is also strong as compared with that from a human being and the reception intensity of the reflection wave from a building is roughly constant like that from a vehicle (see FIG. 1); there is a fear of mistaking the target for a vehicle although the target is a building.

The target determination apparatus (6) determines the type of the target considering not only the judgment result of the first determination unit (namely, the judgment result as to whether or not the fluctuation state of the reception intensity of the reflection wave from the target with time corresponds to the distinctive state occurring when the target is the predetermined type), but also the judgment result as to whether or not the target moves.

The vehicle may stop (not move) or may run and move. On the other hand, the building does not move. Therefore, the judgment result as to whether or not the target moves is also considered, whereby whether the target is a vehicle or a building can be determined.

A target determination apparatus (7) according to an embodiment of the invention further includes a transmission unit, which emits an electromagnetic wave to the target. The electromagnetic wave emitted by the transmission unit is a pulse modulated electromagnetic wave.

To realize a preventive safety system excellent in performance, it is very important to keep track of the distance to the target. Several methods for measuring the distance to the target are possible; if a dedicated apparatus for measuring the distance to the target is provided, a problem of increasing the cost occurs.

According to the target determination apparatus (7), the electromagnetic wave transmitted from the transmission unit is a pulse modulated electromagnetic wave (pulse radar), so that the distance to the target can be found easily. The distance to the target can be obtained from the time for which the electromagnetic pulse goes to the target and backs. Accordingly, a preventive safety system excellent in performance can be realized without much increasing the cost.

DETAILED DESCRIPTION OF THE PREFERRED EMBODIMENT

Figure 4:
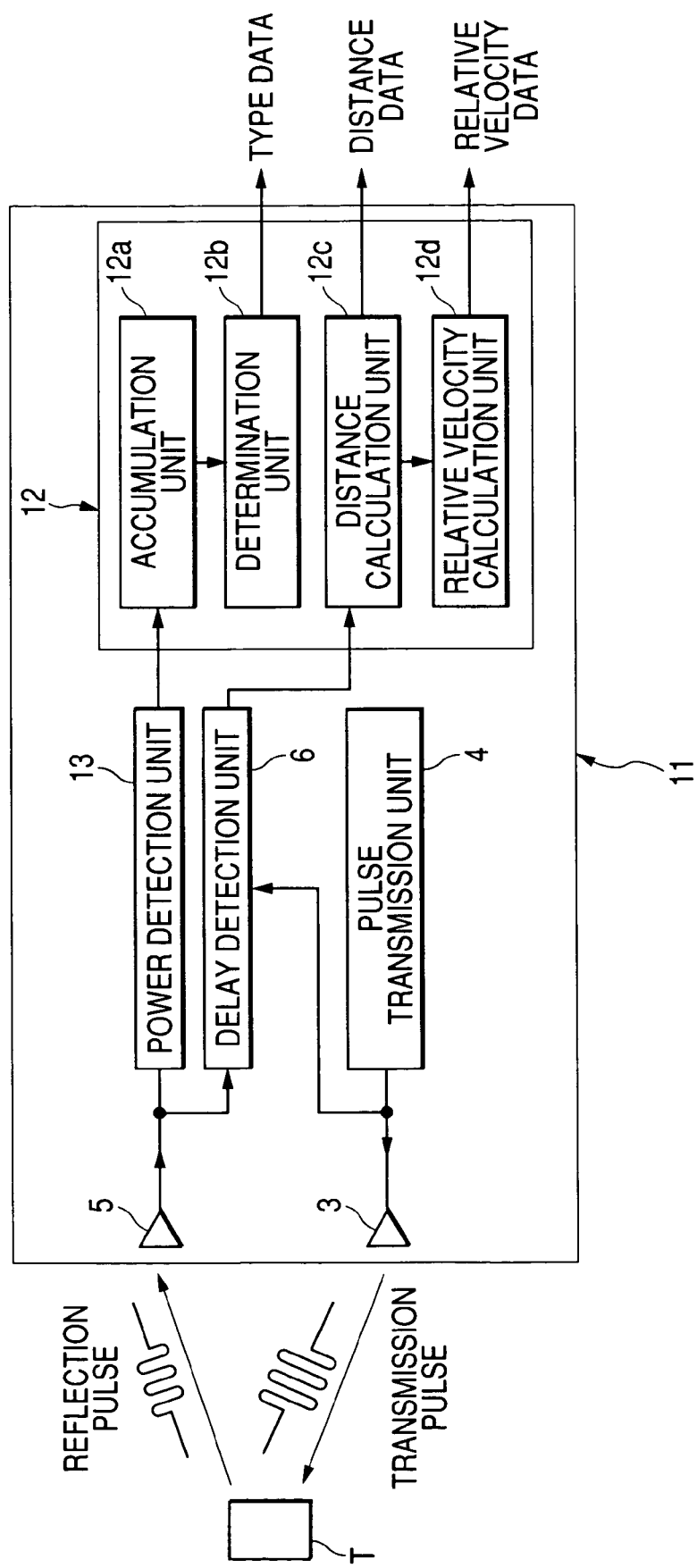
FIG. 4 is a block diagram to schematically show the main part of a target determination apparatus according to a first embodiment of the invention.
Figure 8:
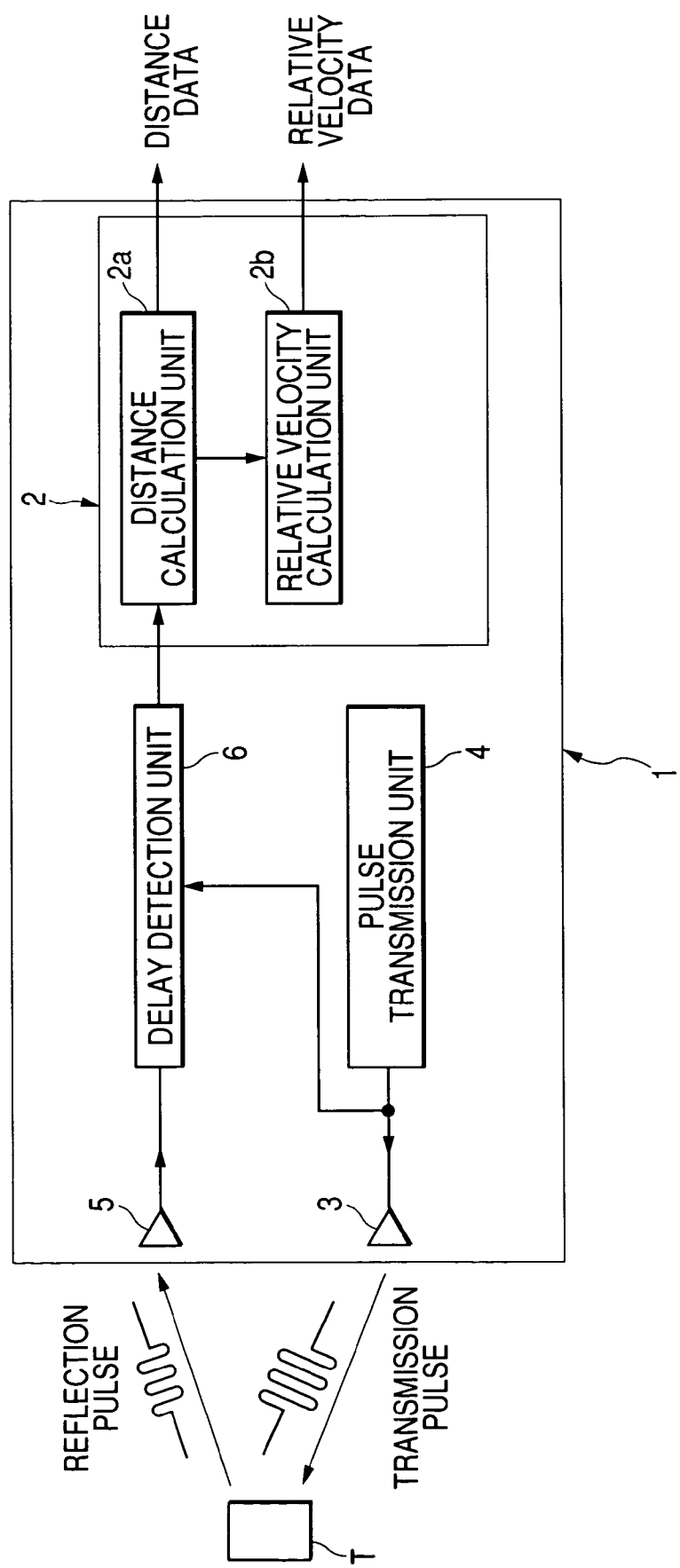
FIG. 8 is a block diagram to schematically show the main part of a radar in a related art.

Referring now to the accompanying drawings, a target determination apparatus according to one embodiment of the invention will be described. FIG. 4 is a block diagram to schematically show the main part of a target determination apparatus according to a first embodiment of the invention. Components similar to those of the radar 1 previously described with reference to FIG. 8 are denoted by the same reference numerals in FIG. 4.

In the figure, numeral 11 denotes a radar for monitoring an object existing ahead of a vehicle M. The radar 11 includes a microcomputer 12, a transmission antenna 3, a pulse transmission unit 4, a reception antenna 5, a delay detection unit 6, and a power detection unit 13. The pulse transmission unit 4 emits an electromagnetic pulse from the transmission antenna 3. The electromagnetic wave emitted from the transmission antenna 3 and striking a target T (for example, the vehicle ahead) is again radiated (namely, reflected) in every direction at the target T and only a part of the electromagnetic wave is returned in the original direction. The reception antenna 5 receives a very small amount of the electromagnetic pulse.

The delay detection unit 6 is connected to the pulse transmission unit 4 to keep track of the electromagnetic pulse emitting timing; is connected to the reception antenna 5 to keep track of the reflection pulse receiving timing; and can detect the time between emitting the electromagnetic pulse and receiving the reflection pulse (namely, delay time). Letting the delay time be $\Delta t$, distance R to the target T can be obtained as $c\Delta t/2$ (where c is the speed of light and $3\times 10^8$ m/s).

The power detection unit 13 is connected to the reception antenna 5, which detects reception power S of the signal received at the reception antenna 5 and can detect reception power of the reflection pulse received at the reception antenna 5.

The microcomputer 12 is connected to the delay detection unit 6 to acquire data concerning the delay time $\Delta t$ and is connected to the power detection unit 13 to acquire data concerning the reception power S of the signal received at the reception antenna 5. The microcomputer 12 includes an accumulation unit 12a, a determination unit 12b, a distance calculation unit 12c, and a relative velocity calculation unit 12d.

The accumulation unit 12a accumulates the data concerning the reception power S provided by the power detection unit 13 in memory m (not shown) in the microcomputer 12. The determination unit 12b determines as to whether or not the fluctuation state of the reception power S with time corresponds to the distinctive state occurring when the target T is a human being, on the basis of the data accumulated in the memory m, thereby determining the type of target T.

The distance calculation unit 12c obtains the distance R to the target T on the basis of the data concerning the delay time $\Delta t$ provided by the delay detection unit 6. The relative velocity calculation unit 12d monitors the distance R obtained by the distance calculation unit 12c in time sequence and obtains relative velocity $\Delta v$ of the target T on the basis of the change of the distance R with time.

Figure 5:
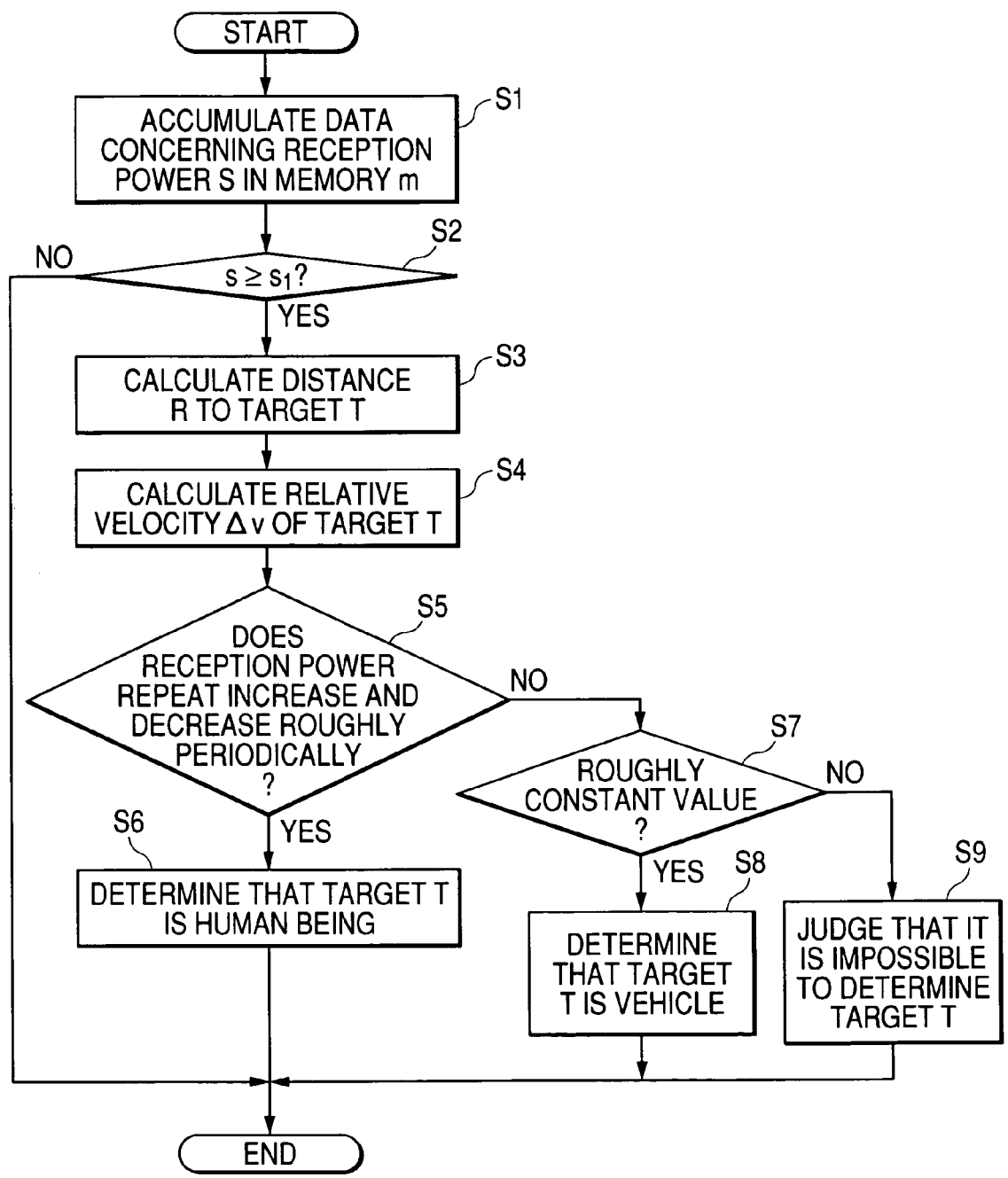
FIG. 5 is a flowchart to show the processing operation performed by a microcomputer in the target determination apparatus according to the first embodiment of the invention.

A processing operation (1) performed by the microcomputer 12 in the target determination apparatus (radar 11) according to the first embodiment will be discussed with reference to a flowchart of FIG. 5. To begin with, the data concerning the reception power S provided by the power detection unit 13 (namely, the data concerning the reception power S of the signal received at the reception antenna 5) is accumulated in the memory m (step S1). Next, it is determined as to whether or not a signal with the reception power S equal to or more than a predetermined value $S_1$ is received, on the basis of the data concerning the reception power S provided by the power detection unit 13 (step S2).

If it is determined that a signal with the reception power S equal to or more than the predetermined value $S_1$ is received, it is assumed that an object (target T) exists ahead of the vehicle M. Next, the distance R to the target T is found based on the data concerning the delay time $\Delta t$ provided by the delay detection unit 6 (step S3) and the relative velocity $\Delta v$ of the target T is found based on the time change of the found distance R (step S4). Incidentally, in the processing operation (1), the steps 3 and 4 may be omitted.

Figure 1:
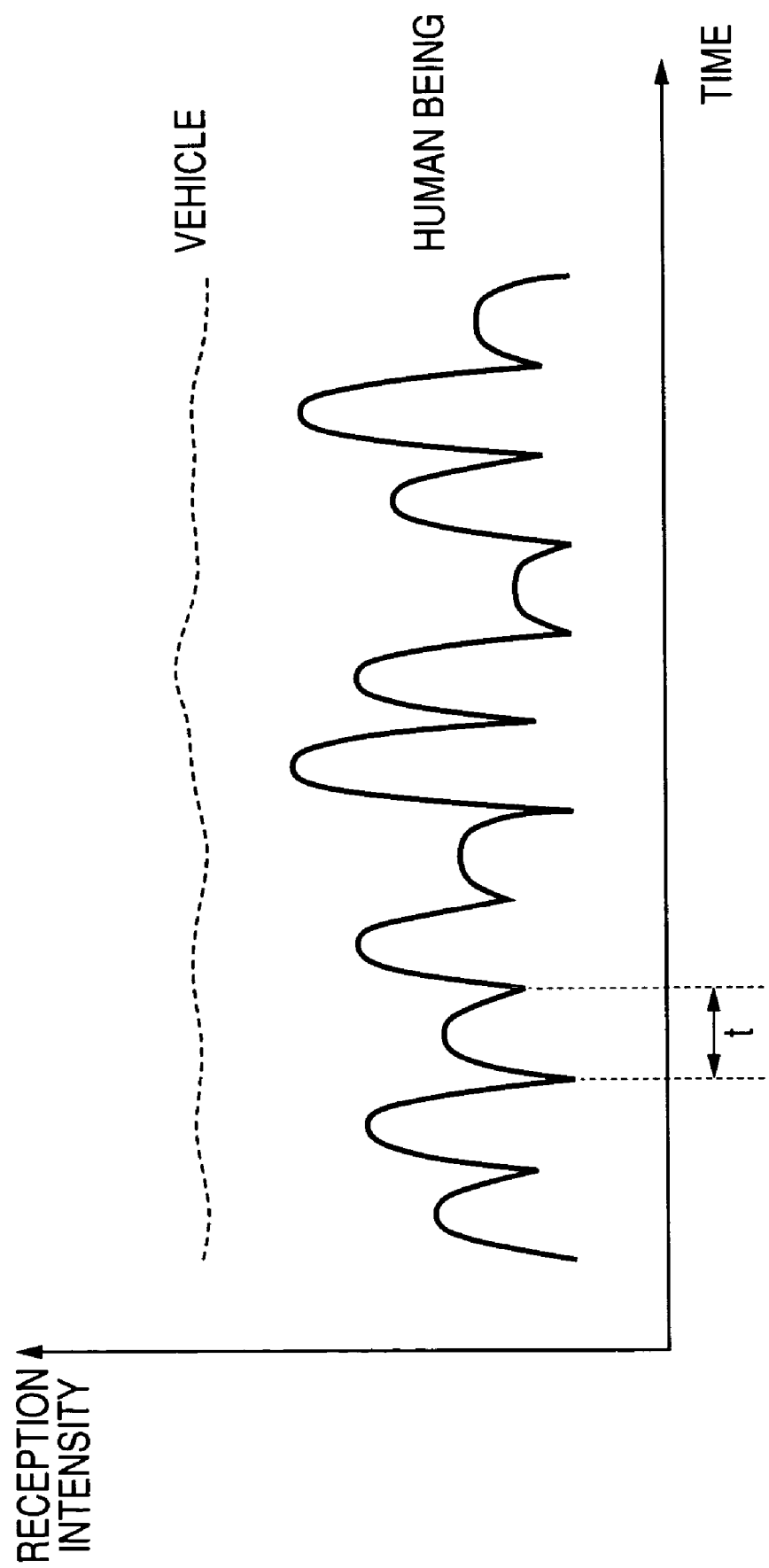
FIG. 1 is a graph to show the fluctuation state of reception intensitys with time change upon reception of reflection pulses striking a human being and a vehicle and coming back therefrom.

Next, it is determined as to whether or not the reception power S repeats increase and decrease roughly periodically for a predetermined time $t_1$ or more, on the basis of the data stored in the memory m (step S5). A specific example of the "roughly periodic" includes Rayleigh distribution and Ricean distribution as set forth above with reference to FIG. 1.

If it is determined that the reception power S repeats increase and decrease roughly periodically for the predetermined time $t_1$ or more, the target T is determined to be a human being (step S6).

On the other hand, if it is determined at step S5 that the reception power S does not repeat increase and decrease roughly periodically for the predetermined time $t_1$ or more, then it is determined as to whether or not the reception power S is roughly constant and is equal to or more than a predetermined value $S_2$ ($>S_1$) for a predetermined time $t_2$ or more (step S7). If it is determined that the reception power S is roughly constant and is equal to or more than the predetermined value $S_2$ for the predetermined time $t_2$ or more, the target T is determined to be another vehicle (step S8).

If it is not determined at step S7 that the reception power S is roughly constant equal to or more than the predetermined value $S_2$ for the predetermined time $t_2$ or more, then it is judged that it is impossible to determine the type of target T (step S9). If it is determined at step S2 that a signal with the reception power S equal to or more than the predetermined value $S_1$ is not received, step S3 and the later steps need not be executed and therefore processing operation (1) is terminated.

The target determination apparatus (radar 11) according to the first embodiment determines whether or not the fluctuation state of the reception power (reception intensity) S from the target T with time corresponds to the distinctive state occurring when the target T is the predetermined type (for example, human being or vehicle), and determines the type corresponding to the target T based on the determination result.

For example, if the fluctuation state of the reception power S of the reflected wave from the target T with time is a state in which the reception power S repeats increase and decrease roughly periodically (namely, the distinctive state occurring when the target T is a human being), the target T can be determined to be a human being; on the other hand, if the fluctuation state of the reception power S of the reflected wave from the target T with time is a state in which the time period during which the reception power S is roughly constant and is equal to or more than the predetermined value $S_2$ continues for a predetermined time (namely, the distinctive state occurring when the target T is a vehicle), the target T can be determined to be a vehicle.

Accordingly, it can be determined as to whether or not the target T is a human being, so that the performance of a preventive safety system for preventing the vehicle M from colliding with a pedestrian can be enhanced. It can also be determined as to whether the object that the vehicle M collides with is a pedestrian or another vehicle, so that the steps to be taken at the collision time can be made in response to the object that the vehicle M collides with and the performance of a collision safety system can be enhanced.

Figure 6:
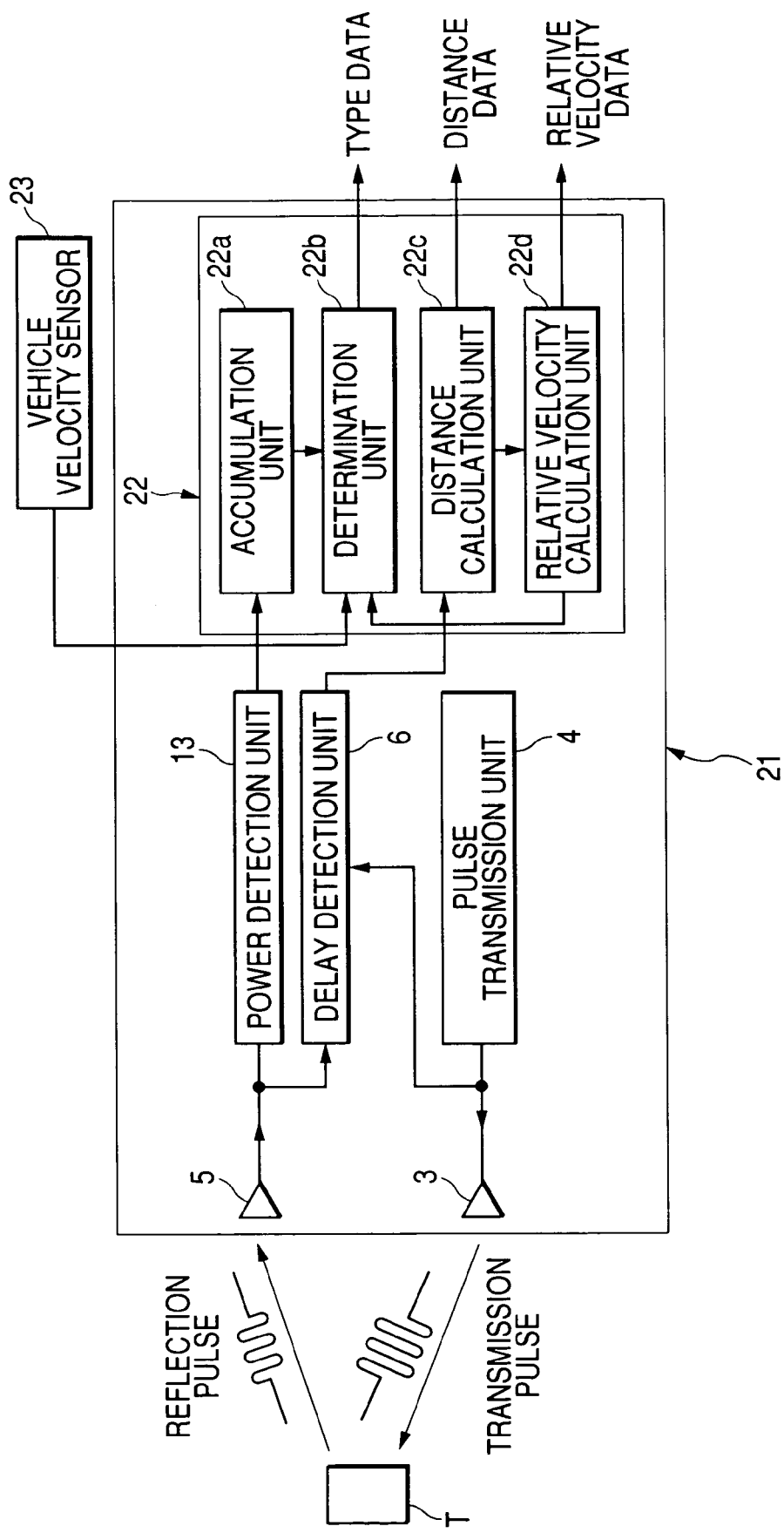
FIG. 6 is a block diagram to schematically show the main part of a target determination apparatus according to a second embodiment of the invention.

FIG. 6 is a block diagram to schematically show the main part of a target determination apparatus according to a second embodiment of the invention. Components similar to those of the radar 11 previously described with reference to FIG. 4 are denoted by the same reference numerals in FIG. 6 and will not be discussed again. In the figure, numeral 21 denotes a radar for monitoring an object existing ahead of a vehicle M. The radar 21 includes a microcomputer 22, a transmission antenna 3, a pulse transmission unit 4, a reception antenna 5, a delay detection unit 6, and a power detection unit 13.

The microcomputer 22 is connected to the delay detection unit 6 to acquire data concerning delay time Δt, is connected to the power detection unit 13 to acquire data concerning reception power S of the signal received at the reception antenna 5, and is connected to a vehicle velocity sensor 23, which detects velocity v of the vehicle M, to acquire data concerning the velocity v of the vehicle M. The microcomputer 22 includes an accumulation unit 22a, a determination unit 22b, a distance calculation unit 22c, and a relative velocity calculation unit 22d.

The accumulation unit 22a accumulates the data concerning the reception power S provided by the power detection unit 13 in memory m (not shown) in the microcomputer 22. The determination unit 22b determines whether or not the fluctuation state of the reception power S with time corresponds to the distinctive state occurring when the target T is a human being on the basis of the data accumulated in the memory m, thereby determining the type of target T.

The distance calculation unit 22c obtains the distance R to the target T on the basis of the data concerning the delay time Δt provided by the delay detection unit 6. The relative velocity calculation unit 22d monitors the distance R obtained by the distance calculation unit 22c in time sequence and obtains relative velocity Δv of the target T on the basis of the change of the distance R with time.

Figure 7:
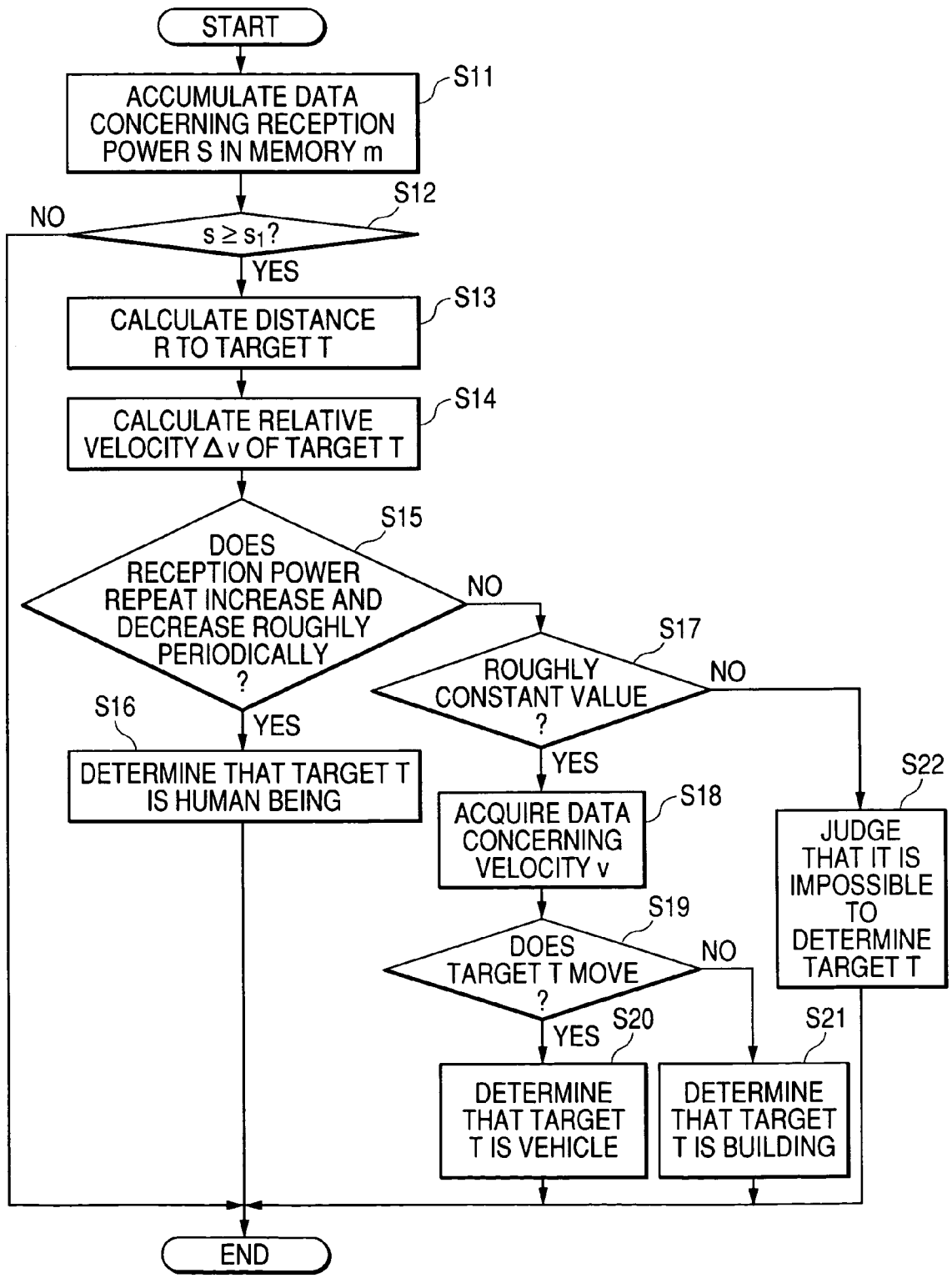
FIG. 7 is a flowchart to show the processing operation performed by a microcomputer in the target determination apparatus according to the second embodiment of the invention.

A processing operation (2) performed by the microcomputer 22 in the target determination apparatus (radar 21) according to the second embodiment will be discussed with reference to a flowchart of FIG. 7. To begin with, the data concerning the reception power S provided by the power detection unit 13 (namely, the data concerning the reception power S of the signal received at the reception antenna 5) is accumulated in the memory m (step S11). Next, it is determined as to whether or not a signal with the reception power S equal to or more than a predetermined value $S_1$ is received, on the basis of the data concerning the reception power S provided by the power detection unit 13 (step S12).

If it is determined that a signal with the reception power S equal to or more than the predetermined value $S_1$ is received, it is assumed that an object (target T) exists ahead of the vehicle M. Next, the distance R to the target T is obtained on the basis of the data concerning the delay time Δt provided by the delay detection unit 6 (step S13) and the relative velocity Δv of the target T is obtained on the basis of the change of the found distance R with time (step S14).

Next, it is determined as to whether or not the reception power S repeats increase and decrease roughly periodically for a predetermined time $t_1$ or more, on the basis of the data stored in the memory m (step S15). If it is determined that the reception power S repeats increase and decrease roughly periodically for the predetermined time $t_1$ or more, the target T is determined to be a human being (step S16).

On the other hand, if it is determined at step S15 that the reception power S does not repeat increase and decrease roughly periodically for the predetermined time $t_1$ or more, then it is determined as to whether or not the reception power S is roughly constant and is equal to or more than a predetermined value $S_2$ ($>S_1$) for a predetermined time $t_2$ or more (step S17). If it is determined that the reception power S is roughly constant and is equal to or more than the predetermined value $S_2$ for the predetermined time $t_2$ or more, then the data concerning the velocity v of the vehicle M provided by the vehicle velocity sensor 23 is acquired (step S18).

Next, it is determined as to whether or not the target T moves, on the basis of the data concerning the velocity v of the vehicle M and the data concerning the relative velocity Δv of the target T (step S19). If it is determined that the target T moves (for example, velocity v—relative velocity Δv is not close to 0), the target is determined to be another vehicle (step S20). On the other hand, if it is determined that the target T does not move (for example, velocity v—relative velocity Δv is close to 0 or is 0), the target is determined to be a building rather than another vehicle (step S21).

If it is not determined at step S17 that the reception power S is roughly and is constant equal to or more than the predetermined value $S_2$ for the predetermined time $t_2$ or more, then it is judged that it is impossible to determine the type of target T (step S22). If it is determined at step S12 that a signal with the reception power S equal to or more than the predetermined value $S_1$ is not received, step S13 and the later steps need not be executed and therefore processing operation (2) is terminated.

The target determination apparatus (radar 21) according to the second embodiment determines whether or not the fluctuation state of the reception power (reception intensity) S from the target T with time corresponds to the distinctive state occurring when the target T is the predetermined type (for example, human being, vehicle) and determines whether or not the target T moves, and determines the type of the target T on the basis of the determination results.

For example, if the fluctuation state of the reception power S of the reflected wave from the target T with time is a state in which the reception power S repeats increase and decrease roughly periodically (namely, the distinctive state occurring when the target T is a human being), the target T can be determined to be a human being; on the other hand, if the fluctuation state of the reception power S of the reflected wave from the target T with time is a state in which the time period during which the reception power S is roughly constant and is equal to or more than the predetermined value $S_2$ continues for a predetermined time (namely, the distinctive state occurring when the target T is a vehicle or a building) and the target T moves, the target T can be determined to be a vehicle; if the target T does not move, the target T can be determined to be a building.

Accordingly, it can be determined whether or not the target T is a human being, so that the performance of a preventive safety system for preventing the vehicle M from colliding with a pedestrian can be enhanced. It can also be determined which of a pedestrian, another vehicle, and a building an object that the vehicle M collides with is, so that the steps to be taken at the collision time can be made in response to the object that the vehicle M collides with and the performance of a collision safety system can be enhanced.

In the target determination apparatus (radar 11 or 21) according to the first or second embodiment, if it is determined that the reception power S repeats increase and decrease roughly periodically for the predetermined time $t_1$ or more, the target T is determined to be a human being; on the other hand, if it is determined that the reception power S is roughly constant and is equal to or more than the predetermined value $S_2$ for the predetermined time $t_2$ or more, the target T is determined to be another vehicle (or a building). However, a manner of the determination as to whether the target T is a human being or another vehicle (or a building) is not limited to the above described determinations; any determination manner can be adopted so long as it can determine as to whether or not the fluctuation state of the reception intensity of the reflected wave from the target T with time corresponds to the distinctive state occurring when the target T is a human being or a vehicle (or a building). For example, the number of peaks occurring during a predetermined time is counted and if it is determined that the number of peaks is equal to or more than a predetermined value, the target T is determined to be a human being.

A target determination apparatus according to still another embodiment may determine whether the target T is a human being or a vehicle (or a building) on the basis of the state of the reception frequency distribution or the state of the reception cumulative frequency distribution, which is obtained from the magnitude of the reception intensity at the reception antenna 5.

Figure 2:
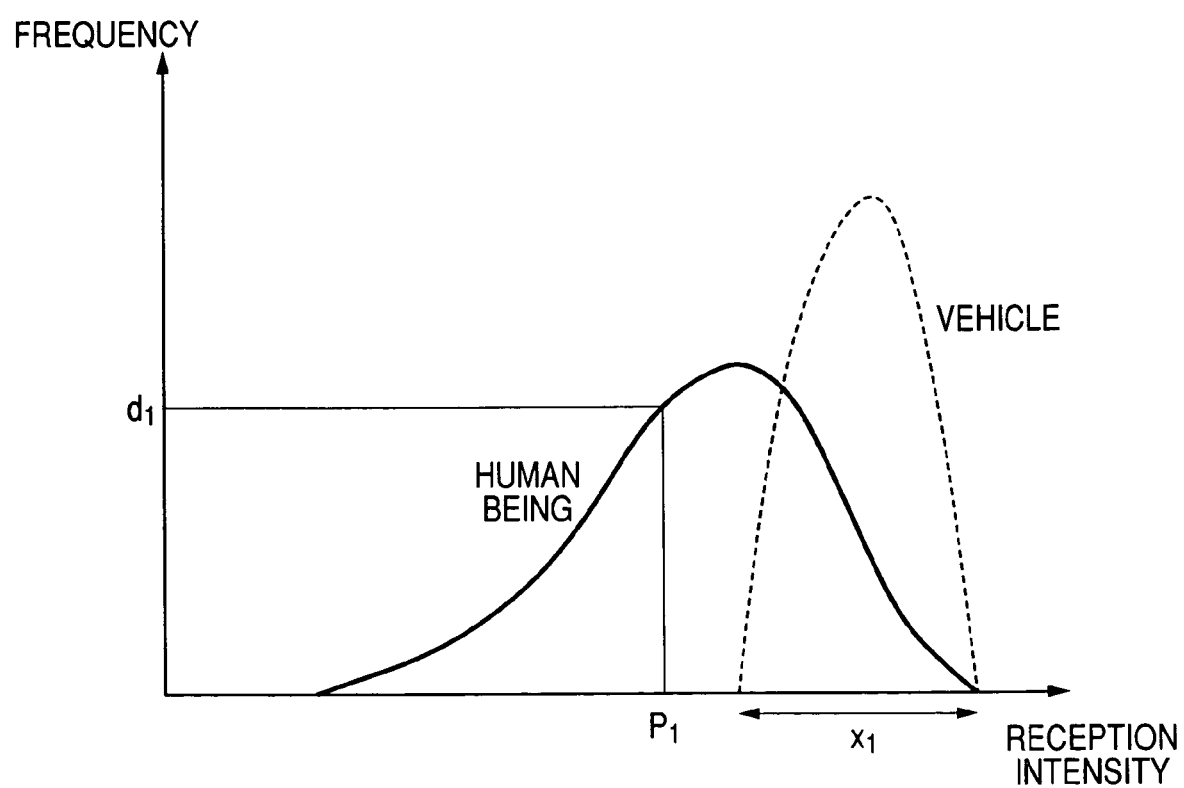
FIG. 2 is a graph to show the fluctuation state of reception intensitys with time change upon reception of reflection pulses striking a human being and a vehicle and coming back therefrom as reception frequency distributions based on the magnitudes of the reception intensitys.

As shown in FIG. 2, comparing human being with a vehicle, the reception frequency distribution of the wave reflected from human being is wider than that of the wave reflected from a vehicle. The inventors conducted experiments and found that the reception frequency distributions of the wave reflected from a vehicle and a building had a width (x dB) less than a predetermined value $x_1$ dB (that is, x dB<$x_1$ dB). On the other hand, the reception frequency distribution of the wave reflected from human being had a width more than $x_1$ dB. Therefore, a target determination apparatus according to another embodiment of the invention may compare the width of the reception frequency distribution with $x_1$ dB to determine the type of the target T.

Figure 3:
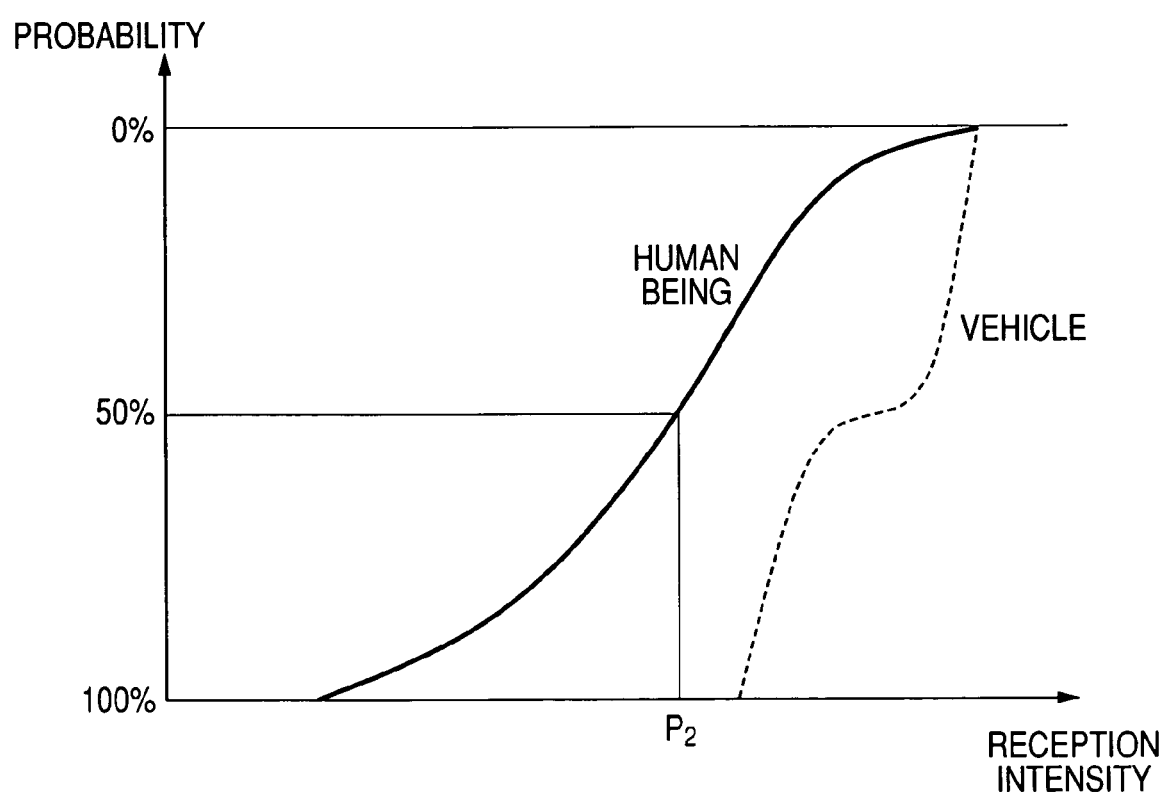
FIG. 3 is a graph to show the fluctuation state of reception intensitys with time change upon reception of reflection pulses striking a human being and a vehicle and coming back therefrom as probability distributions of reception cumulative frequencies based on the magnitudes of the reception intensitys.

From FIGS. 2 and 3, the inventors also founds that the reception frequency distribution of the wave reflected from human being included reception intensities less than a predetermined intensity (for example, $P_1$ dB). On the other hand, the reception frequency distribution of the wave reflected from a vehicle was larger than the predetermined intensity ($P_1$ dB). Therefore, the target determination apparatus according to another embodiment of the invention may compare the intensity of the received wave with the predetermined intensity to determine the type of the target T.

The inventors further found that the wave reflected from some vehicle indicated a symmetric reception frequency distribution as shown in FIG. 2. Therefore, the target determination apparatus according to another embodiment of the invention may determine the target T to be a vehicle when a reception frequency distribution is symmetric.

In the above description, only the cases using the pulse radar to measure the reception intensity of the reflected wave from the target T are described. However, implementing of the target determination apparatus according to the invention is not limited to the pulse radar; any modification may be made so long as an apparatus can measure the parameters required for calculating the radar cross section of the target T. For example, an apparatus for transmitting a continuous wave signal such as a CW radar, a UWB (Ultra Wide Band) system, or the like may be adopted.

What is claimed is:

1. A target determination apparatus comprising:
   a reception unit which receives a reflection wave from a target;
   a first judgment unit which judges as to whether or not a fluctuation of reception intensity of the reflection wave with time corresponds to a target that is a predetermined type, on the basis of information concerning the reception intensity of the reflection wave; and
   a determination unit which determines type of the target on the basis of judgment result of the first judgment unit;
   wherein when the reception intensity of the reflection wave repeats increase and decrease roughly periodically, the first judgment unit judges that the fluctuation of the reception intensity of the reflection wave with time indicates that the target is a human being.

2. The target determination apparatus according to claim 1, wherein when change of the reception intensity of the reflection wave with time indicates one of Rayleigh distribution and Ricean distribution, the first judgment unit judges that the fluctuation of the reception intensity of the reflection wave with time indicates that the target is a human being.

3. The target determination apparatus according to claim 1, wherein when the reception intensity of the reflection wave is roughly constant, the first judgment unit judges that the fluctuation of the reception intensity of the reflection wave with time indicates that the target is a vehicle.

4. The target determination apparatus according to claim 3, wherein when the reception intensity of the reflection wave is roughly constant and is equal to or larger than a first predetermined value, the first judgment unit judges that the fluctuation of the reception intensity of the reflection wave with time indicates that the target is a vehicle.

5. The target determination apparatus according to claim 1, further comprising:
   a second judgment unit which judges as to whether or not the target moves, wherein:
   the determination unit determines the type of the target on the basis of the judgment result of the first judgment unit and judgment result of the second judgment unit.

6. The target determination apparatus according to claim 1, further comprising:
   a transmission unit which emits an electromagnetic wave to the target, wherein:

the electromagnetic wave emitted by the transmission unit is a pulse modulated electromagnetic wave.

7. A target determination apparatus comprising:
a reception unit which receives a reflection wave from a target;
a first judgment unit which judges as to whether or not a fluctuation of reception intensity of the reflection wave with time corresponds to a target that is a predetermined type, on the basis of information concerning the reception intensity of the reflection wave; and
a determination unit which determines type of the target on the basis of judgment result of the first judgment unit;
wherein the first judgment unit judges as to whether or not the fluctuation of reception intensity of the reflection wave with time corresponds to a target that is a predetermined type, on the basis of a reception frequency distribution of the reflection wave, which is obtained from the reception intensity of the reflection wave.

8. The target determination apparatus according to claim 7, wherein:
when a width of the reception frequency distribution of the reflection wave is less than a second predetermined value, the first judgment unit judges that the fluctuation of the reception intensity of the reflection wave with time indicates that the target is a human being; and
when a width of the reception frequency distribution of the reflection wave is larger than the second predetermined value, the first judgment unit judges that the fluctuation of the reception intensity of the reflection wave with time indicates that the target is a vehicle.

9. The target determination apparatus according to claim 7, wherein:
when all components of the reception frequency distribution of the reflection wave are larger than a third predetermined value, the first judgment unit judges that the fluctuation of the reception intensity of the reflection wave with time indicates that the target is a human being; and
when the reception frequency distribution of the reflection wave includes a component less than the third predetermined value, the first judgment unit judges that the fluctuation of the reception intensity of the reflection wave with time indicates that the target is a vehicle.

10. The target determination apparatus according to claim 7, further comprising:
a second judgment unit which judges as to whether or not the target moves, wherein:
the determination unit determines the type of the target on the basis of the judgment result of the first judgment unit and judgment result of the second judgment unit.

11. The target determination apparatus according to claim 7, further comprising:
a transmission unit which emits an electromagnetic wave to the target, wherein:
the electromagnetic wave emitted by the transmission unit is a pulse modulated electromagnetic wave.

12. A target determination apparatus comprising:
a reception unit which receives a reflection wave from a target;
a first judgment unit which judges as to whether or not a fluctuation of reception intensity of the reflection wave with time corresponds to a target that is a predetermined type, on the basis of information concerning the reception intensity of the reflection wave; and
a determination unit which determines type of the target on the basis of judgment result of the first judgment unit;
wherein the first judgment unit judges as to whether or not the fluctuation of reception intensity of the reflection wave with time corresponds to a target that is a predetermined type, on the basis of a cumulative reception frequency distribution of the reflection wave, which is obtained from the reception intensity of the reflection wave.

13. The target determination apparatus according to claim 12, further comprising:
a second judgment unit which judges as to whether or not the target moves wherein:
the determination unit determines the type of target on the basis of the judgment result of the first judgment unit and judgment result of the second judgment unit.

14. The target determination apparatus according to claim 12, further comprising:
a transmission unit which emits an electromagnetic wave to the target, wherein:
the electromagnetic wave emitted by the transmission unit is a pulse modulated electromagnetic wave.

* * * * *